United States Patent
Sridhar et al.

(10) Patent No.: US 12,113,710 B2
(45) Date of Patent: *Oct. 8, 2024

(54) METHOD AND SYSTEM FOR MANAGING ACCESS CONGESTION

(71) Applicant: Sandvine Corporation, Waterloo (CA)

(72) Inventors: Kamakshi Sridhar, Plano, TX (US); Ty Sayers, Waterloo (CA); Alexander Osman, Dubai (AE)

(73) Assignee: Sandvine Corporation, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,408

(22) Filed: Apr. 17, 2023

(65) Prior Publication Data
US 2023/0254252 A1  Aug. 10, 2023

Related U.S. Application Data

(63) Continuation of application No. 17/232,956, filed on Apr. 16, 2021, now Pat. No. 11,632,328.

(Continued)

(51) Int. Cl.
*H04L 47/122* (2022.01)
*H04L 47/10* (2022.01)
(Continued)

(52) U.S. Cl.
CPC .......... *H04L 47/122* (2013.01); *H04L 47/283* (2013.01); *H04L 47/29* (2013.01);
(Continued)

(58) Field of Classification Search
CPC ... H04L 47/122; H04L 47/125; H04L 47/283; H04L 47/29; H04L 47/76; H04L 47/762; H04L 47/781; H04L 47/805; H04L 47/828

(Continued)

(56) References Cited

U.S. PATENT DOCUMENTS 7,512,176 B1    3/2009   Beser
8,341,266 B2 *  12/2012  Olariu ............... H04W 28/082
                                                  725/95

(Continued)

FOREIGN PATENT DOCUMENTS

CA    3057536 A1    4/2020

OTHER PUBLICATIONS

European Patent Office, European Search Report for Corresponding EP Pat. App No. 21168546.6, dated Oct. 1, 2021.

(Continued)

*Primary Examiner* — Robert J Lopata
(74) *Attorney, Agent, or Firm* — Neil W. Henderson; Amarok IP Inc.

(57) ABSTRACT

A system and method for managing access congestion in a computer network, the system and method including: determining a plurality of channels within the computer network via a subscriber channel module; determining a set of subscribers for each of the channels of the plurality of channels via the subscriber channel module; determining a congestion level of each of the channels of the plurality of channels via an analysis module; determining each subscriber's impact on the respective channel based on each subscriber's network usage via the analysis module; and determining a reallocation of the subscribers to balance the channels, based on the congestion level and each subscriber's network usage, via a distribution module.

18 Claims, 7 Drawing Sheets

Related U.S. Application Data

(60) Provisional application No. 63/011,399, filed on Apr. 17, 2020.

(51) Int. Cl.
*H04L 47/283* (2022.01)
*H04L 47/762* (2022.01)
*H04L 47/78* (2022.01)
*H04L 47/80* (2022.01)

(52) U.S. Cl.
CPC .......... *H04L 47/762* (2013.01); *H04L 47/781* (2013.01); *H04L 47/805* (2013.01)

(58) Field of Classification Search
USPC ......................................................... 370/329
See application file for complete search history.

(56) References Cited

U.S. PATENT DOCUMENTS

| | | | |
|---|---|---|---|
| 8,788,647 B1* | 7/2014 | Nolle | H04N 21/2385 375/222 |
| 9,300,489 B1* | 3/2016 | Nolle | H04L 12/56 |
| 2002/0027884 A1* | 3/2002 | Halme | H04L 47/283 370/400 |
| 2005/0052992 A1* | 3/2005 | Cloonan | H04L 47/326 348/E7.063 |
| 2006/0072452 A1* | 4/2006 | Olariu | H04W 8/04 370/229 |
| 2006/0120282 A1* | 6/2006 | Carlson | H04L 12/2876 370/431 |
| 2007/0110098 A1* | 5/2007 | Hart | H04L 47/13 370/464 |
| 2007/0192482 A1* | 8/2007 | Smith | H04W 16/22 709/224 |
| 2010/0238924 A1 | 9/2010 | Liu | |
| 2012/0140624 A1* | 6/2012 | Denman | H04L 47/22 370/230.1 |
| 2013/0279334 A1* | 10/2013 | Xu | H04L 47/125 370/235 |
| 2016/0183126 A1* | 6/2016 | Roy | H04B 7/18513 370/322 |
| 2017/0373950 A1* | 12/2017 | Szilagyi | H04L 47/2416 |
| 2018/0027468 A1* | 1/2018 | Pasulka | H04W 36/22 370/235 |
| 2021/0067414 A1* | 3/2021 | Costa | H04N 21/6118 |
| 2021/0135950 A1* | 5/2021 | Buyukkoc | H04W 52/36 |
| 2021/0203410 A1* | 7/2021 | Khan | H04B 7/18534 |

OTHER PUBLICATIONS

Communication 94(3), European Patent Office, on corresponding EP Application No. 21168546.6 dated Jan. 22, 1 2024.

* cited by examiner

| Bonding Group | Subscriber | Activity time | Category |
|---|---|---|---|
| BG1 | 'a' | 6PM to 12AM | Q4 (4th quarter of the day) |
| BG1 | 'b' | 6AM to 12PM | Q2 (2nd quarter of the day) |
| BG1 | 'c' | 6AM to 12PM | Q2 (2nd quarter of the day) |
| BG1 | 'd' | 12PM to 6PM | Q3 (3rd quarter of the day) |
| BG3 | 'w' | 12PM to 6PM | Q3 (3rd quarter of the day) |
| BG3 | 'x' | 6PM to 12AM | Q4 (4th quarter of the day) |
| BG3 | 'y' | 6AM to 12PM | Q2 (2nd quarter of the day) |
| BG3 | 'z' | 12AM to 6AM | Q1 (1st quarter of the day) |

FIG. 7

METHOD AND SYSTEM FOR MANAGING ACCESS CONGESTION

RELATED APPLICATIONS

The present application claims priority on U.S. Provisional Patent Application No. 63/011,399 filed Apr. 17, 2020 and is a continuation of U.S. patent application Ser. No. 17/232,956 filed Apr. 16, 2021 which are hereby incorporated herein in their entirety.

FIELD

The present disclosure relates generally to computer network traffic. More particularly, the present disclosure relates to a system and method for managing access congestion in a computer network. The managing may include managing uplink or downlink congestion or both.

BACKGROUND

Computer networks and online traffic continue to be more common and more people are connecting to networks through various types of devices. When subscribers work more often from home, congestion can increase significantly for fixed access operators including, for example, cable operators. For example, for a leading US Cable operator, the growth in upstream traffic during a two week period of the Coronavirus Pandemic was an equivalent increase to what might otherwise have taken an entire year. As such, network operators, service providers, and platform operators have a desire to understand which subscribers are being impacted and how to improve the Subscriber Quality of Experience (QoE) for network access, including upstream access, with and without immediate traffic capacity expansion investments.

As such, there is a desire for an improved system and method for managing access congestion.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a method for managing access congestion in a computer network, the method including: determining a plurality of channels within the computer network; determining a set of subscribers for each of the channels of the plurality of channels; determining a congestion level of each of the channels of the plurality of channels; determining each subscriber's impact on the respective channel based on each subscriber's network usage; and determining a reallocation of the subscribers to balance the channels, based on the congestion level and each subscriber's network usage.

In some cases, the computer network may be a cable network.

In some cases, each of the channels may be either a bonding group or a service group.

In some cases, determining the congestion level of each channel may include: determining an average round trip time (RTT) of each channel; determining a mean round trip time of a cable modem termination system associated with the plurality of channels; and determining if each of the average round trip times for each channel is above a predetermined congestion level threshold.

In some cases, determining the congestion level of each channel may include: determining a correlation between RTT and throughput for each channel; and determining whether the correlation between throughput and RTT is above a predetermined congestion level threshold.

In some cases, determining the congestion level of each channel may include: determining a Quality of Experience (QoE) level for each channel of the plurality of channels; and determining, for each of the channels, that the channel is congested if the QoE level is below a predetermined threshold.

In some cases, determining each subscriber's impact on the respective channel may include: determining a number of bytes sent by each subscriber in the channel; determining a total number of bytes sent through the channel; and determining each subscriber's contribution based on the number of bytes of each subscriber over the total number of bytes.

In some cases, determining each subscriber's impact on the respective channel may include: determining the bandwidth used by each subscriber in the channel; determining an overall bandwidth transmitted through the channel; determining an average subscriber throughput based on the overall bandwidth of the channel and a number of subscribers associated with the channel; and determining each subscriber's contribution based on the duration of time each subscriber has throughput higher than the average subscriber throughput on the channel.

In some cases, the plurality of channels may include both bonding groups and service groups and the set of subscribers in each bonding group is not equivalent to the set of subscribers in each service group.

In some cases, the reallocation of subscribers may provide for a higher average QoE for the plurality of subscribers of the computer network.

In some cases, the method may further include: monitoring the congestion level of each channel of the plurality of channels; determining if any of the congestion levels for each channel is over a predetermined congestion level threshold; and reallocating subscribers based on the congestion level of each of the channels and each subscriber's impact on the respective channel.

In some cases, the reallocation of subscribers may be based on the subscriber's impact to the congestion level at various times of the day.

In some cases, the reallocation of subscribers may be based on the subscriber's impact to the congestion level during peak hours.

In another aspect, there is provided a system for managing access congestion in a computer network, the system including: a subscriber channel module configured to determine a plurality of channels within the computer network and determine a set of subscribers for each of the channels of the plurality of channels; an analysis module configured to determine a congestion level of each of the channels of the plurality of channels and determine each subscriber's impact on the respective channel based on each subscriber's network usage; and a distribution module configured to determine a reallocation of the subscribers to balance the channels, based on the congestion level and each subscriber's network usage.

In some cases, the network may be a cable network.

In some cases, each of the channels are either a bonding group or a service group.

In some cases, the analysis module may be configured to: determine an average round trip time (RTT) of each channel; determine a mean round trip time of a cable modem termination system associated with the plurality of channels; and determine if each of the average round trip times for each channel is above a predetermined congestion level threshold.

In some cases, the analysis module may be further configured to: determine a Quality of Experience (QoE) level for each channel of the plurality of channels; and determine, for each of the channels, that the channel is congested if the QoE level is below a predetermined threshold.

In some cases, when determining each subscriber's impact on the respective channel the analysis module may be configured to: determine a number of bytes sent by each subscriber in the channel; determine a total number of bytes sent through the channel; and determine each subscriber's contribution based on the number of bytes of each subscriber over the total number of bytes.

In some cases, the plurality of channels may include both bonding groups and service groups and the set of subscribers in each bonding group is not equivalent to the set of subscribers in each service group.

In some cases, the reallocation of subscribers may provide for a higher average QoE for the plurality of subscribers of the computer network.

In some cases, the system may further include a monitoring module configured to: monitor the congestion level of each channel of the plurality of channels; determine if any of the congestion levels for each channel is over a predetermined congestion level threshold; and the distribution module is configured to reallocate subscribers based on the congestion level of each of the channels and each subscriber's impact on the respective channel.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

FIG. 7 is a table showing various bonding groups and the associated subscribers, activity time and category according to an example.

DETAILED DESCRIPTION

Figure 1:
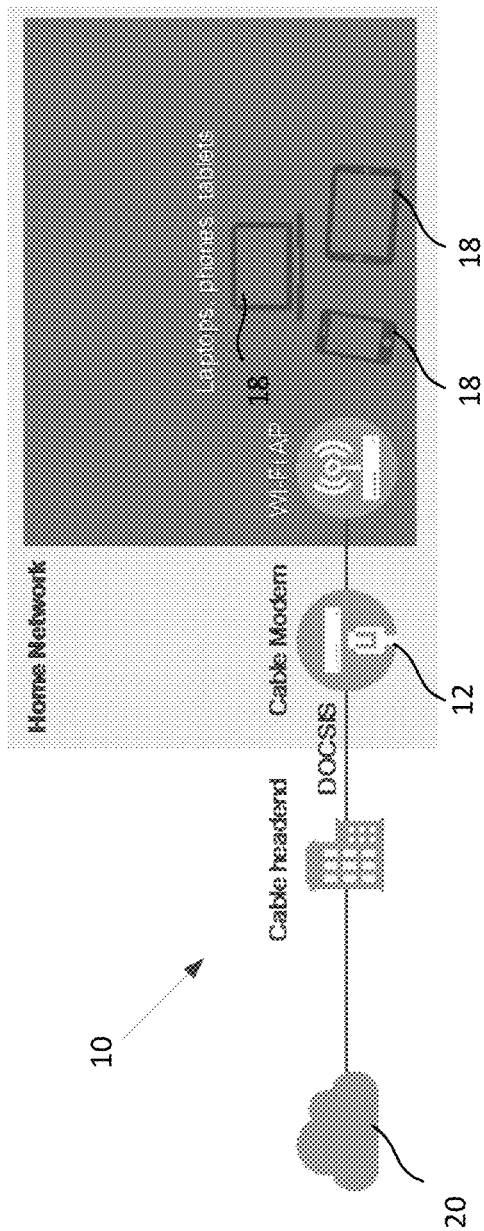
FIG. 1 illustrates a cable network architecture.

Generally, the present disclosure provides a method and system for managing access congestion. In particular, the method and system provides for managing access congestion in a fixed access environment, such as, for example, a cable network. Generally, the system and method are configured to determine channels, for example, bonding groups and/or service groups for each of a plurality of subscribers within the network. The system analyzes the bonding and/or service group statistics and determines whether some bonding and/or service groups are overly congested. The system further determines the contribution of each subscriber to the bonding group or service group congestion level. The system and method can be configured to provide for a redistribution of subscribers in bonding groups and/or service groups, which is intended to better utilize the available bandwidth. In some cases, the system and method may notify the operator of an appropriate redistribution of subscribers. In other cases, the system may provide for an action to modify the distribution of subscribers within the bonding group or service group.

In fixed access networks, such as cable networks, channels are typically bonded together in upstream and downstream directions. Bonding allows for increased transmission speed by spreading the data over two or more Radio Frequency channels. Different channels may be bonded in either direction such that the subscribers in an upstream group (where data is transferred from the subscriber to a server) may not be equivalent to the subscribers in a downstream group (where data is transferred from the server to the subscribers). A group of subscribers in the downstream direction typically share the capacity in a Service Group (SG). Traffic from a Cable Modem Termination System (CMTS) tends to be dispersed across a plurality of Service Groups. Traffic destined for subscribers within a SG is sent over a shared channel.

As an example, a typical DOCSIS 3.1 modem bonds 24 downstream channels and 8 upstream ones, providing data rates of about 10 Gbps down and 1 Gbps up. In some cases, a plurality of channels can be bonded together to increase the capacity.

A Downstream Channel Bonding feature is intended to help cable operators offer higher downstream (DS) bandwidth per cable modem (CM) user by combining multiple radio frequency (RF) channels to form a larger bonding group at the MAC layer. A group of bonded channels in the downstream direction is referred to as a Service Group. Channels within a Service Group can be shared by a plurality of customers (often referred to as subscribers) at the same time.

An Upstream Channel Bonding feature is intended to help cable operators offer higher upstream (US) bandwidth per cable modem (CM) user by combining multiple radio frequency (RF) channels to form a larger bonding group at the MAC layer. Bonded channels in the upstream direction is referred to as a Bonding Group. Channels within a Bonding Group can be shared by a plurality of customers at the same time.

A group of subscribers in the upstream direction share the capacity in a Bonding Group (BG). Traffic from a plurality of BGs is generally aggregated towards the CMTS. Traffic from subscribers within a BG can be sent over a shared channel.

Conventionally, service groups and bonding groups tended to be determined by the cable network operator statically. Further these groups tended to be based on geographical characteristics of the subscribers.

Embodiments of the system and method detailed herein are intended to provide for dynamic allocation of subscribers within service groups and bonding groups. By determining various characteristics about one or more subscriber's use of the network, embodiments of the system and method are intended to provide for a more even distribution of subscribers based on their characteristics of use, for example, time of use, uplink usages, downlink usage, application type, network congestion and the like. The system and method are intended to provide for dynamic allocation of service groups and bonding groups, which is intended to provide an overall higher level of QoE for all subscribers. The QoE is the perception by the user of the ability of the network to deliver the bits for the traffic in a timely manner, with low loss and latency.

FIG. 1 shows a schematic of a typical fixed access network, in this case, an example Cable Network Architecture. A cable subscriber or end user have end user devices 18, which access the Internet 20 via the Cable Network 10. For example, in the Cable Network 10, a Cable Modem Termination System (CMTS) 12 connects to the cable service provider's network. There is a Hybrid Fiber Coax network between a plurality of end users 18 and the CMTS 12. A similar situation applies in DSL networks, Satellite networks, Fixed Wireless Access networks or the like. Each of these networks deliver broadband data through their infrastructure to, for example, a home or an enterprise. In these networks, a subscriber may experience poor QoE for one or more applications on the subscriber's devices due to, for example, access congestion, either in the uplink or downlink direction. The degree of access congestion will depend on the type of access infrastructure, for example, Cable, DSL or fixed wireless access.

Figure 2:
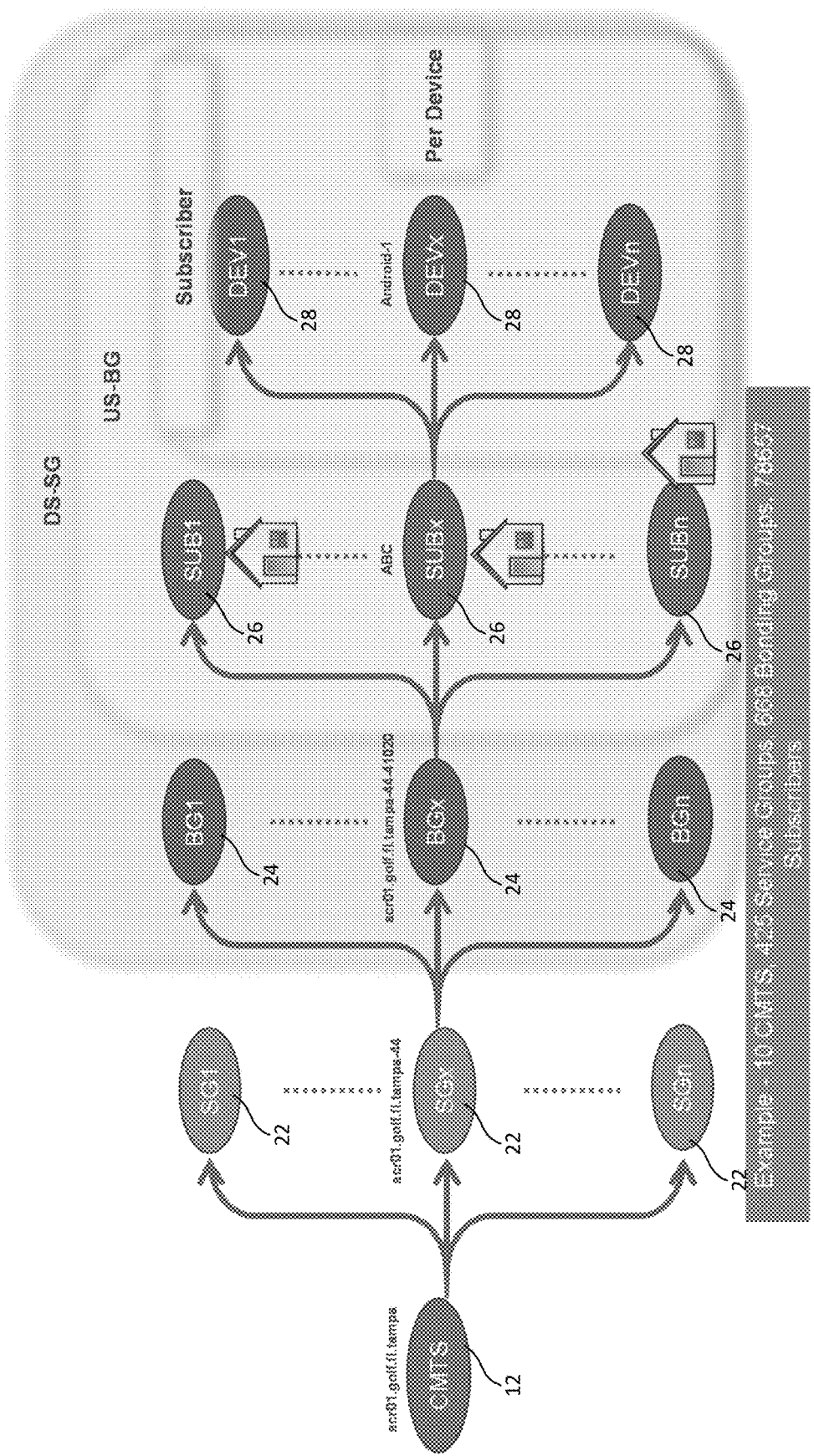
FIG. 2 illustrates a cable network overall DOCSIS architecture.

FIG. 2 provides an example of Cable Modem Termination System 12 in greater detail. The CMTS may be broken down into a plurality of services groups 22 wherein each service group may include at least one bonding group 24. Each bonding group 24 may include at least one subscriber 26 and a subscriber may have a plurality of connected devices 28.

Figure 3:
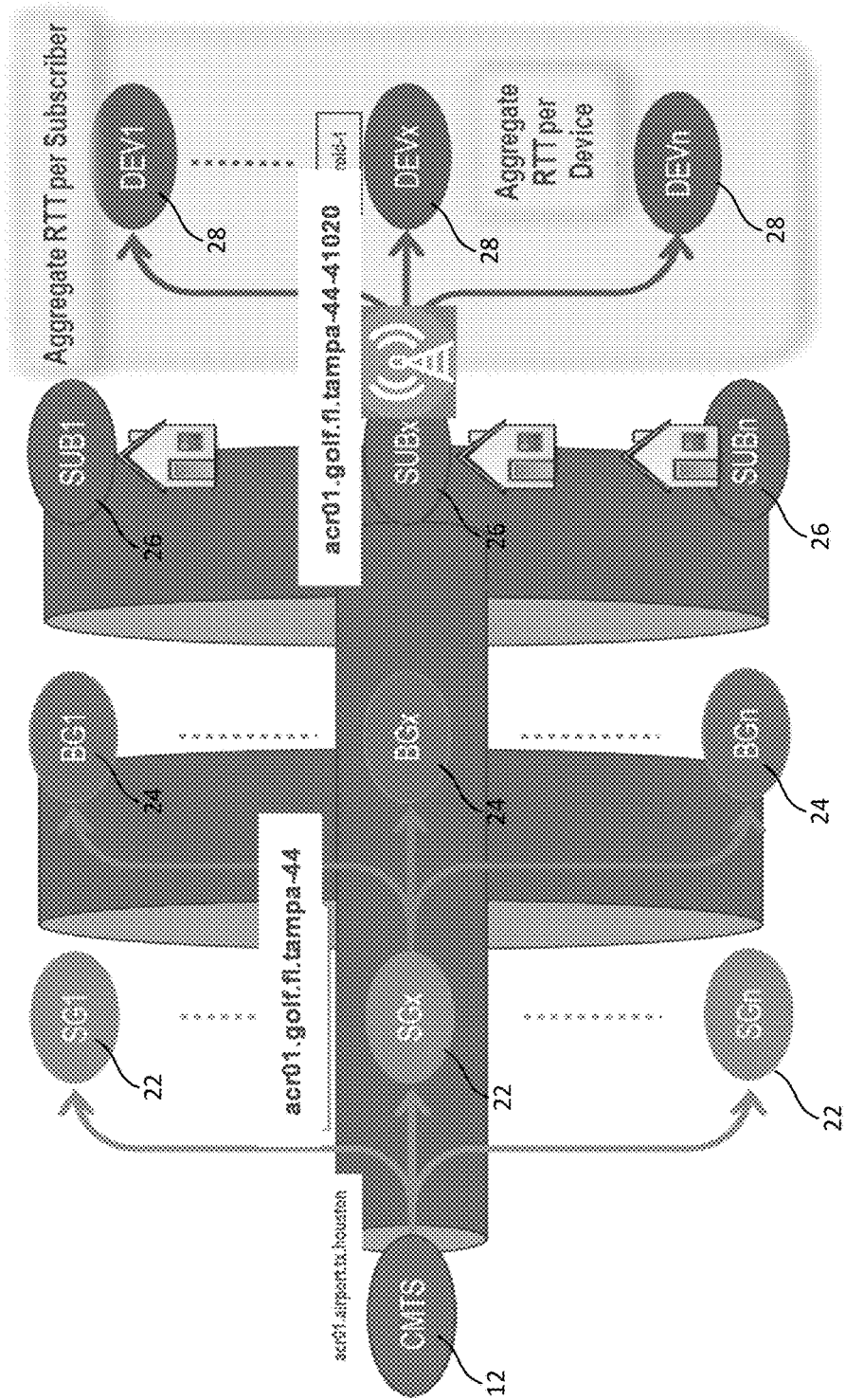
FIG. 3 illustrates a cable network DOCSIS downstream architecture.
Figure 4:
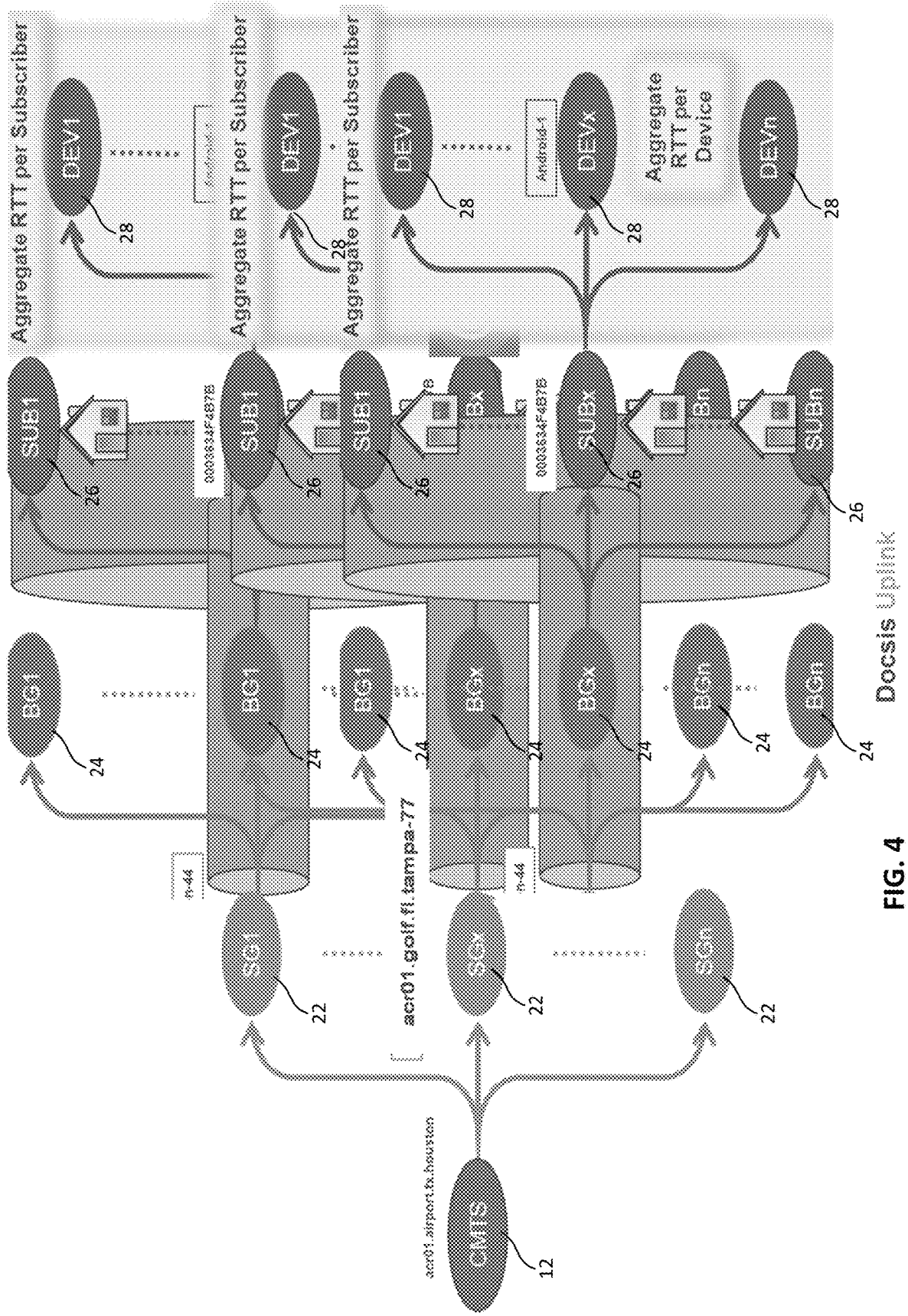
FIG. 4 illustrates a cable network DOCSIS upstream architecture.

FIG. 3 illustrates an example of a downlink environment for Data Over Cable Service Interface Specifications (DOCSIS) environment. FIG. 4 illustrates an example of an uplink for the same environment. FIG. 3 illustrates a Service Group 22 SGx which may send data to subscribers in various Bonding Groups 24. In the Uplink direction in FIG. 4, the subscriber service by a specific Service Group 22 may be associated with different Bonding Groups 24. It will be understood that it is not generally a one-to-one relationship between Service Groups and Bonding Groups. Subscribers who are associated with the same Service Group may be associated with different bonding Groups.

In these networks, a subscriber may experience poor QoE for one or more applications on the subscriber's devices due to, for example, access congestion, either in the uplink or downlink direction. The degree of access congestion will depend on the number of subscribers transmitting data for a given application, the average throughput per application, the peak throughput per application, the duration of the session, and the like.

In a specific example, traffic flow in an upstream direction is considered although similar concepts apply in other situations. In this example, there are three bonding groups namely BG1, BG2, BG3. It will be understood that for network operators, there would be many bonding groups with a significant number of subscribers per bonding group. The specific example is a simplified version to aid in the understanding of the system and method detailed herein.

In the example, there may be several "heavy traffic subscribers" [a, b, c, d] in BG1. There may be a set of "medium traffic subscribers" [p, q, r, s] in BG2. There are also several "light traffic subscribers" [w, x, y, z] in BG3. The characterization of "heavy", "medium" and "light" subscribers may be based on criteria such as peak throughput consumed on a given time period (or during a peak time period), aggregate bytes sent in a given time period (or during a peak time period), or the like. It will be understood that the time period may be hours, a day, two days, or the like. Generally speaking, the characterizations may be configurable and adjustable.

In this specific example, BG1 will likely be the most congested because many subscribers, each consuming significant bandwidths (by virtue of their application mix), are accessing a shared capacity and the queues within the routers and nodes servicing these subscribers may get filled up or overloaded as a result. Once these network devices are overloaded, the traffic packets may get delayed and the subscribers [a, b, c, d] may experience low or poor QoE. Poor QoE can manifests itself by long web download times, poor resolution and/or clarity for a streaming video, slow responses for a gaming application, or the like.

On the other hand, BG3 may be only lightly congested. Subscribers [w, x, y, z] will have good QoE since the subscribers have access to the available bandwidth, and as light subscribers, the respective queues do not get filled up. The bandwidth availability exceeds the requirements for the light subscribers and these subscribers have desirable QoE.

Embodiments of the system and method detailed herein are intended to help operators decide how to allocate subscribers across various channels, such as bonding groups or service groups to ensure maximal QoE across a majority of the subscribers.

In one aspect, embodiments of the system and method are intended to improve the QoE of [a,b,c,d] while maintaining the QoE or maybe slightly lowering the (already good) QoE of [w,x,y,z]. It is intended to provide a higher average QoE for subscribers [a, b, c, d, w, x, y, z] because the combined bandwidth of BG1 and BG3 are better utilized based on the subscriber traffic patterns and criteria. Similarly, [p, q, r, s] can be added in the distribution, if desired, or may stay in the same bonding group as the group is sufficiently maximized.

Figure 5:
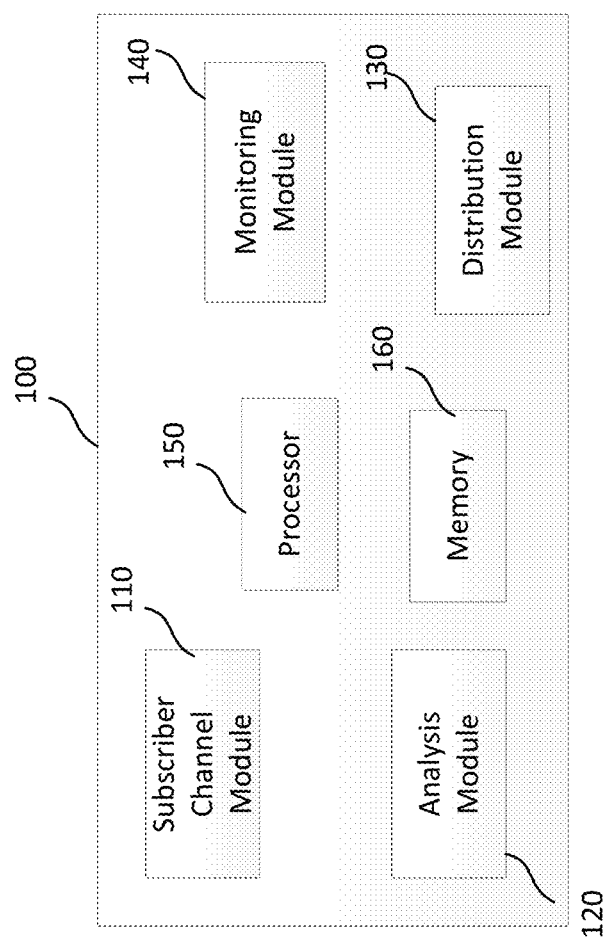
FIG. 5 illustrates a system for managing access congestion according to an embodiment.

FIG. 5 illustrates a system 100 for managing access congestion. The system includes a subscriber channel module 110, an analysis module 120, a distribution module 130, a monitoring module 140, at least one processor 150 and at least one memory 160 component. The system is intended to reside on the core network but could be further distributed. The modules, including the processor 150 and memory 160, are in communication with each other but may be distributed over various network devices or may be housed within a single network device. The system 100 is intended to receive information from the computer network equipment that allows the system to determine traffic flow, performance statistics and subscriber data.

The subscriber channel module 110 is configured to determine the service group and bonding group of each subscriber, or the channels, within the network operator's network. In some cases, this data may be stored on a network operator device and the subscriber channel module 110 may retrieve the data from the network operator device. The Service Group and Bonding Group information is typically populated by the network operator in tables or provided by the operator through provisioning files via, for example, a PCMM (Packet Cable MultiMedia). Packet Cable MultiMedia (PCMM) provides an interface to control and management service flow for CMTS network elements. The network operator may periodically reassign a subscriber to a different Service Group or a different Bonding Group. Any reassignment is intended to be pushed to or retrieved by the subscriber channel module 110

The analysis module 120 is configured to determine the congestion level of each channel, for example each bonding group and/or each service group of the network operators' plurality of bonding and service groups. The analysis module 120 may further determine the contribution to the congestion level of each subscriber within a particular group. Channels within the same bonding group typically have the same bandwidth and the same modulation scheme. Channels within the same service group typically have the same bandwidth and the same modulation scheme. However, it may be different from the bandwidth of the bonding group. In a specific example, DOCSIS 3.0 has downstream channel bandwidth of 6 MHz and upstream channel bandwidths up to 6.4 MHz, with channel bonding.

The distribution module 130 is configured to determine a distribution of the subscribers between the available channels, for example a distribution of subscribers between the plurality of bonding groups or service groups within the network. In some cases, the distribution module 130 may provide instructions to redistribute the subscribers, in other cases the distribution module 130 may notify the network operator of a maximized or improved distribution. An improved distribution is intended to have higher average QoE among the subscribers, even if there are some subscribers that may have a slightly lower QoE.

The monitoring module 140 is configured to monitor the congestion levels of the plurality of channels, the Bonding and the Service Groups and the overall subscriber QoE within the network. The monitoring may be done continuously or periodically at predetermined monitoring periods. If the congestion level of at least one Service Group or Bonding Group reaches a predetermined level, the monitoring module 140 may determine that a further redistribution of subscribers would benefit the overall subscriber QoE. The congestion level is measured via a normalized metric, for example, a Bonding Group Rank (BG_RANK), Service Group Rank, or the like as detailed herein. If the BG_RANK exceeds a configured value, for example, 1, 1.2, or the like, then the Bonding Group is considered to have reached a level to necessitate redistribution of users across different groups.

In some cases, if the overall subscriber QoE is below a desirable threshold, the monitoring module 140 may determine that a redistribution of subscribers would be beneficial for the network. The QoE threshold is determined by comparing the QoE of the subscribers, as measured by, for example, average RTT of all the subscribers, to the highest (and therefore worst case) RTT that has resulted in a subscriber to complain. In some cases, the lower subscriber QoE may not be able to be improved without further intervention, for example, an increase in additional network capacity. Adding additional capacity would require additional CAPEX. Alternatively, the operator may upgrade the network to a higher DOCSIS standard, for example, from DOCSIS 3.0 to DOCSIS 4.0. It will be understood that subscriber QoE is affected by many conditions and access congestion may not be the driving condition in some cases of lowered subscriber QoE.

Figure 6:
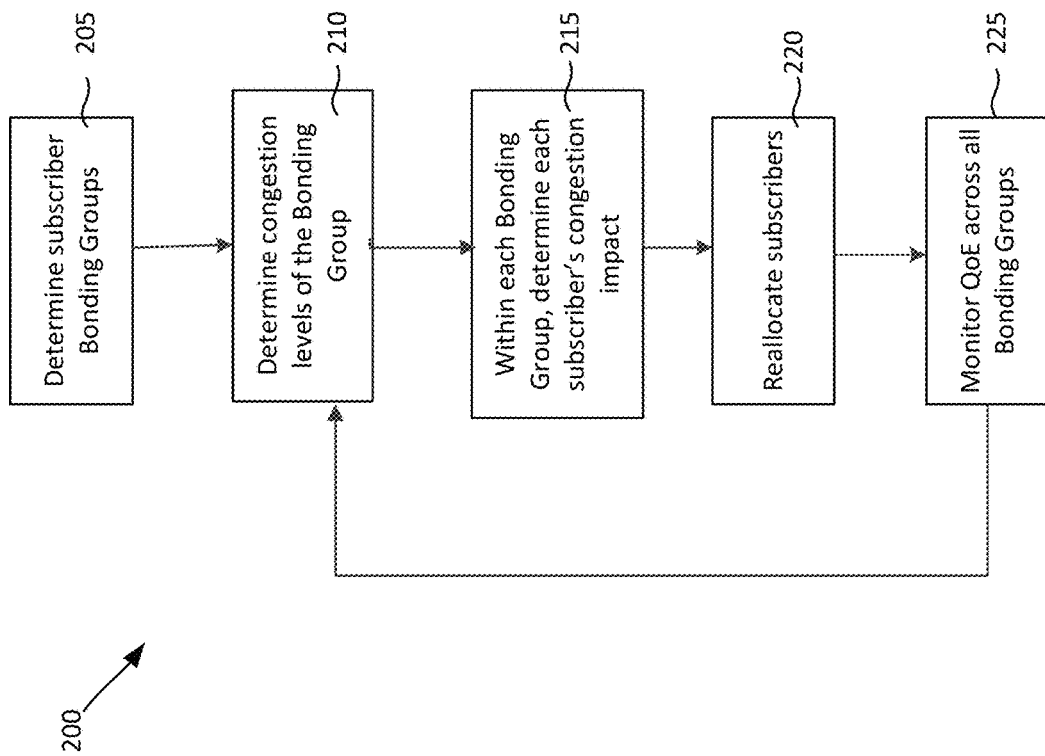
FIG. 6 is a flow chart of a method for managing access congestion according to an embodiment.

FIG. 6 is a flow chart of an embodiment of a method 200 for managing access congestion. At 205, the subscriber channel module 110 may determine which subscribers are in which Bonding Groups and/or Service Groups. In some cases, the subscriber channel module 110 may retrieve the subscriber distribution from a network operator device to determine the channels of the subscribers, including the Bonding and the Service Groups. At 210, the analysis module 120 is intended to determine which Bonding Groups are congested, or the congestion level of each of the Bonding Groups of a plurality of Bonding Groups within the network operator's network. In other cases, the analysis module 120 is intended to determine which Service Groups are congested, or the congestion level of each of the Service Groups of a plurality of Service Groups.

At 215, the analysis module 120 is further configured to determine the contribution or impact to the congestion of each subscriber of the plurality of subscribers within the congested Bonding Group or Service Group. At 220, the distribution module 130 is configured to determine a redistribution for the plurality of subscribers, or reallocate the subscribers among the Bonding Groups or Service Groups based on the subscriber's traffic patterns the subscriber's relative traffic volume contribution to the overall traffic volume, and characteristics and the channels capabilities. The system may perform corrective action, for example, performing actions to improve the QoE of the subscriber by reassigning the subscribers to different upstream Bonding Groups or downstream Service Groups. In some cases, the system may notify the network operator of appropriate Service Groups and/or Bonding Groups based on the suggested redistribution. At 225, the monitoring module 140 is configured to continue the monitoring of the plurality of Bonding Groups and/or Service Groups to determine whether a further redistribution or reallocation may be required when, for example, subscriber patterns change. The principles described herein are intended to apply fixed access network, for example, Cable networks.

In a specific example of the system and method for managing access congestion, Bonding Groups of a network operator are reviewed. It will be understood that the system and method would generally be equally applicable to Service Groups. As with the specific example noted above, it is assumed that the network operator has three bonding groups, "heavy subscribers" [a, b, c, d] in BG1, "medium traffic subscribers" [p, q, r, s] in BG2 and "light subscribers" [w, x, y, z] in BG3. It will be understood that a network operator would have significantly more bonding groups and subscribers than used in this example.

Once the bonding groups of the subscribers have been determined by the subscriber channel module 110, the analysis module 120 is configured to determine which bonding group of the plurality of bonding groups are congested.

The analysis module 130 is configured to determine the rank of each of the plurality of bonding groups. The analysis module is configured to determine the round trip time (RTT) of the bonding group and the mean of the RTT of the CMTS. The analysis module 130 then determines the rank of the bonding group as follows:

$$BG1\_RANK = (BG1RTT - mean\_oftheCMTS\_RTT)/StdDev\_oftheCMTSRTT$$

where:

Mean_oftheCMTS_RTT=sum of the mean RTT's of all Bonding Groups (in the example, BG1, BG2, BG3)/# of Bonding Groups=3; and StdDev_oftheCMTS_RTT=STD_DEV of the RTT's of all Bonding Groups (in the example, BG1, BG2, BG3)

Likewise, the rank of each of the other bonding groups are determined. The analysis module, for this example, will further determine BG2_RANK, BG3_RANK. The analysis module may determine that a bonding group is congested if the result is above a certain predetermined threshold, for example 0.7, 0.8, 1, 1.2 or the like. For the example, it is determined that the BG1_RANK exceeded 1 and the system determines that Bonding Group 1 is congested.

In some cases, the system determines that there is poor QoE for a particular bonding group when the mean RTT of subscribers (in this example, subscribers a,b,c,d) exceeds the normalized RTT across all of the other bonding groups that are within the same CMTS by the predetermined threshold based on the standard deviation (stddev), for example 0.8 or 1 stddev.

The analysis module 130 may then determine, for each bonding group or service group, which subscribers within the group contributed to the access congestion. In this example, for each Bonding Group BG1, BG2, BG3, the analysis module 130 is configured to identify which subscribers, within each Bonding Group, contributed to the access congestion in a predetermined time period, for example, within 12 hours, within a day, within two days or the like. For this example, the predetermined time period of a day (24 hours) was used.

The analysis module 130 is configured to distinguish between subscribers 'a', 'b', 'c', and, 'd' by determining a parameter herein referred to as "relative traffic contribution". This parameter can be used to determine the relative traffic contribution by individual subscribers within a bonding group to the traffic within a day. This parameter is intended to be equal to the volume sent by each individual subscriber as a percentage of the total traffic sent by all the subscribers in the same bonding group as defined herein.

In one example, the relative traffic contribution may be determined as follows: for each predetermined time period a counter is kept per subscriber to determine the bytes sent by each of the plurality of subscribers within the channel. The predetermined period may typically be on the order of several minutes. A suitable range could be 5 minutes, 10 minutes, 15 minutes, or the like and may configurable The counter resets each time period at the start of the diagnostics computation. In this example, the counter will reset each day and count the number of bytes per subscriber within the congested bonding group 1.

For the current example, the analysis module determines the following:

For Subscriber 'a': bytes sent by a/(Total bytes sent by all a, b, c, and d together).
For Subscriber 'b': bytes sent by b/(Total bytes sent by all a, b, c, and d together).
For Subscriber 'c': bytes sent by c/(Total bytes sent by all a, b, c, and d together).
For Subscriber 'd': bytes sent by d/(Total bytes sent by all a, b, c, and d together).

From the above, the analysis module is able to determine the level of "relative traffic contribution" per subscriber in the congested bonding group. In some cases, the above metrics may be computed during the peak congested hours. The metrics may be computed at the peak congested hour, since during peak congested hours the access congestion will likely be at its highest. Therefore the computation of these metrics during that time is intended to be more accurate and useful information in deciding the association of subscribers to a bonding group. The choice of deciding whether to consider only the congested hours or the entire day may be operator specific and configurable.

In some cases, the Service Groups or Bonding Groups may have different allocations based on the time of day. In some cases, it may be determined that subscribers have greater impact to the congestion levels at various times of day, and as such, these subscribers may be redistributed or reallocated to various Service Groups or Bonding Groups based on the time of day.

In an alternative approach, the analysis module may determine the relative traffic contribution as follows: each subscriber impact within a bonding group congestion domain is based on the percent of the predetermined time period for which the individual subscriber throughput exceeded the CMTS normalized average throughput. This alternative is configured to identify the hours impacted depending on how long the subscriber was active within the time period. The number of hours impacted is the proportion of the day where the bonding group had a high RTT and high throughput compared to the normalized value across the CMTS group.

For each subscriber, the analysis module is configured to calculate the proportion of the time period for which the subscriber downlink throughput exceeds the Bonding Group throughput average. Every predetermined time interval, for example, every 5, 10, 15, 30 minutes or the like, there is a binary response, for example yes or no. Then, the aggregate of the binary yeses and no's over the time period may be used to decide proportion of day. In this example, the metric outcome may be that subscribers [a,b] may be impacted for 8.5 hours and subscribers [c,d] may be impacted for 2.4 hours. This suggests that subscribers a, and/or b contribute more significantly to the congestion compared to subscribers c or d.

In some cases, this metric can be computed during any of the hours during the time period or during the peak traffic hours during the time period.

In some cases, determining the congestion level of each channel may include: computing a correlation between Throughput and RTT. Pearson's correlation is one way of computing correlation and varies between −1.0 to 1.0. A strong positive correlation between Throughput and RTT is indicative of congestion. Exceeding a threshold of, for example, 0.4 may be indicative of congestion. The threshold is intended to be operator configurable.

In a further alternative approach to computing the relative traffic contribution, it may be determined by the analysis module by reviewing the hours in which the subscribers of the channel are or were the most active. In this example, the analysis module may have determined subscriber use as shown in the table in FIG. 6. In deciding which subscribers to allocate across Bonding Groups, the analysis module may review the previous time period and decide which hours of the day each subscriber was the most active.

It will be understood that the system may use whichever alternative is available based on the availability of metrics to the system. In some cases, it may be possible to review results from more than one alternative and determine which distribution of subscribers may be preferred by the network operator or which may be easier to implement.

Once the analysis module has determined the contribution of the individual subscriber's traffic to the bonding group, the distribution module may determine the re-distribution of subscribers across all bonding groups to improve the overall QoE of the subscribers.

The distribution module is configured to determine a reallocation of subscribers across the available channels of the network depending on the relative traffic contribution during the time period. In some cases, the distribution module will determine the redistribution of the bonding group for the subscribers. In this example, the system will determine to mix 'heavy' and 'light' subscribers in the same bonding group. Based on the outcomes of analysis module from any of the alternatives, subscribers within each BG1, and BG3 may be reassigned as follows: BG1: [a, w, b, x]. BG3: [c, y, d, z].

Thus, the available channel capacities on both the Bonding Groups BG1 and BG3 will be fully utilized to allow for a more improved average subscriber QoE across all subscribers. Likewise BG2 can be added in the mix. Although, this may result in a slight decreases in the QoE of the 'light' subscribers, the overall QoE of the subscribers will be increased and the subscribers that were previously experiencing access congestion are intended to have improved QoE and significantly less access congestion when accessing the Internet. It will be understood that a similar process would be applicable to Service Groups.

In the preceding description, for purposes of explanation, numerous details are set forth in order to provide a thorough understanding of the embodiments. However, it will be apparent to one skilled in the art that these specific details may not be required and that elements of one embodiment may be used with other embodiments or combined in further potential embodiments. In other instances, well-known structures may be shown in block diagram form in order not to obscure the understanding. For example, specific details are not provided as to whether the embodiments or elements thereof described herein are implemented as a software routine, hardware circuit, firmware, or a combination thereof.

Embodiments of the disclosure or elements thereof may be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for managing access congestion in a computer network, the method comprising:
    determining a plurality of channels within the computer network;
    determining a set of subscribers for each of the channels of the plurality of channels;
    determining a congestion level of each of the channels of the plurality of channels;
    determining each subscriber's impact on the respective channel based on each subscriber's network usage, wherein determining each subscriber's impact comprises:
        determining the bandwidth used by each subscriber in the channel;
        determining an overall bandwidth transmitted through the channel;
        determining an average subscriber throughput based on the overall bandwidth of the channel and a number of subscribers associated with the channel; and
        determining each subscriber's contribution based on the duration of time each subscriber has throughput higher than the average subscriber throughput on the channel; and
    determining a reallocation of the subscribers to balance the channels, based on the congestion level and each subscriber's network usage.

2. The method of claim 1 wherein each of the channels are either an upstream bonding group or a Downstream service group.

3. The method of claim 1, wherein determining the congestion level of each channel comprises:
    determining an average round trip time (RTT) of each channel;
    determining a mean round trip time of a cable modem termination system associated with the plurality of channels; and
    determining if each of the average round trip times for each channel is above a predetermined congestion level threshold.

4. The method of claim 1, wherein determining the congestion level of each channel comprises:
    determining a correlation between RTT and throughput for each channel; and
    determining whether the correlation between throughput and RTT is above a predetermined congestion level threshold.

5. The method of claim 1, wherein determining the congestion level of each channel comprises:
    determining a Quality of Experience (QoE) level for each channel of the plurality of channels; and
    determining, for each of the channels, that the channel is congested if the QoE level is below a predetermined threshold.

6. The method of claim 1 wherein determining each subscriber's impact on the respective channel further comprises:
    determining a number of bytes sent by each subscriber in the channel;
    determining a total number of bytes sent through the channel; and
    determining each subscriber's contribution based on the number of bytes of each subscriber over the total number of bytes.

7. The method of claim 1, wherein the plurality of channels comprise both bonding groups and service groups and the set of subscribers in each bonding group is not equivalent to the set of subscribers in each service group.

8. The method of claim 1, wherein the reallocation of subscribers provides for a higher average QoE for the plurality of subscribers of the computer network.

9. The method of claim 1, further comprising:
    monitoring the congestion level of each channel of the plurality of channels;
    determining if any of the congestion levels for each channel is over a predetermined congestion level threshold; and
    reallocating subscribers based on the congestion level of each of the channels and each subscriber's impact on the respective channel.

10. The method of claim 1, wherein the reallocation of subscribers is based on the subscriber's impact to the congestion level at various times of the day.

11. The method of claim 1, wherein the reallocation of subscribers is based on the subscriber's impact to the congestion level during peak hours.

12. A system for managing access congestion in a computer network, the system comprising at least one processor and a memory storing instructions, that when executed by the at least one processor, cause the system to execute:
a subscriber channel module configured to determine a plurality of channels within the computer network and determine a set of subscribers for each of the channels of the plurality of channels;
an analysis module configured to determine a congestion level of each of the channels of the plurality of channels and determine each subscriber's impact on the respective channel based on each subscriber's network usage, wherein determining each subscriber's impact comprises:
determining the bandwidth used by each subscriber in the channel;
determining an overall bandwidth transmitted through the channel;
determining an average subscriber throughput based on the overall bandwidth of the channel and a number of subscribers associated with the channel; and
determining each subscriber's contribution based on the duration of time each subscriber has throughput higher than the average subscriber throughput on the channel; and
a distribution module configured to determine a reallocation of the subscribers to balance the channels, based on the congestion level and each subscriber's network usage.

13. The system of claim 12 wherein each of the channels are either an upstream bonding group or a downstream service group.

14. The system of claim 12, wherein the analysis module is configured to:
determine an average round trip time (RTT) of each channel;
determine a mean round trip time of a cable modem termination system associated with the plurality of channels; and
determine if each of the average round trip times for each channel is above a predetermined congestion level threshold.

15. The system of claim 12, wherein the analysis module is further configured to:
determine a Quality of Experience (QoE) level for each channel of the plurality of channels; and
determine, for each of the channels, that the channel is congested if the QoE level is below a predetermined threshold.

16. The system of claim 12, wherein the plurality of channels comprise both bonding groups and service groups and the set of subscribers in each bonding group is not equivalent to the set of subscribers in each service group.

17. The system of claim 12, wherein the reallocation of subscribers provides for a higher average QoE for the plurality of subscribers of the computer network.

18. The system of claim 12, further comprising a monitoring module configured to:
monitor the congestion level of each channel of the plurality of channels;
determine if any of the congestion levels for each channel is over a predetermined congestion level threshold; and
the distribution module is configured to reallocate subscribers based on the congestion level of each of the channels and each subscriber's impact on the respective channel.

* * * * *